April 21, 1959 R. E. DIETERICH ET AL Re. 24,639

COMBINED HANDLE AND KEY FOR A PERCUSSIVE DRILL

Filed Dec. 8, 1958

Inventors
Frank A. Wersteine
Richard E. Dieterich
By Silverman + Mullin
Attorneys United States Patent Office Re. 24,639
Reissued Apr. 21, 1959

24,639

COMBINED HANDLE AND KEY FOR A PERCUSSIVE DRILL

Richard E. Dieterich and Frank A. Werstein, Long Beach, Ind., assignors to Phillips Drill Company, Michigan City, Ind., a corporation of Illinois

Original No. 2,801,614, dated August 6, 1957, Serial No. 535,669, September 21, 1955. Application for reissue December 8, 1958, Serial No. 779,033

9 Claims. (Cl. 121—36)

Matter enclosed in heavy brackets [ ] appears in the original patent but forms no part of this reissue specification; matter printed in italics indicates the additions made by reissue.

The invention relates generally to percussive drills for driving self-drilling shells and the like and more particularly is concerned with a chuck for such drills having a combined handle and key or ejector.

Self-drilling shells of the general type shown in U.S. Patent 1,621,598 issued March 22, 1957, to J. H. Phillips have tapered rear ends opposite the drilling teeth by means of which the shell is wedged into the tapered receiving socket of a chuck which is in turn mounted on a percussion drill or mechanical hammer. The chuck receives repeated blows from the hammer, causing the teeth to bite into the masonry or concrete, and simultaneously the chuck is axially rotated to cause the resulting hole to be as nearly cylindrical as possible, and to enable the debris to work back through the shell, if same is hollow.

In the case of mechanical hammers, such as for example that shown in U.S. Patent 1,968,055 issued July 31, 1934, to J. H. Phillips, the chuck is provided with a pivotally mounted handle swingable on an axis at right angles to the chuck, usually in the form of a heavy wire loop or bail. The workman holds the mechanical hammer in one hand, urging the same against the ceiling or wall, and with the other hand he rocks the chuck by swinging the handle back and forth in an arc about the axis of the chuck. During this process, the handle is arranged approximately at right angles to the chuck axis, and hence is substantially rigid relative thereto.

After the shell has been sunk to the desired depth, it is withdrawn, the hole is cleaned out, a tapered plug is inserted in the toothed end, and the shell once more inserted into the hole and driven home with several blows of the hammer. The toothed end expands in the hole under the spreading influence of the plug, and the shell is permanently anchored in the masonry. In some instances there is an annular fracture groove at the base of the taper to enable the tapered portion of the shell to be broken off by means of a quick lateral movement of the hammer, leaving the shell flush with the surface or even slightly below the surface. In any event, and whether the tapered portion is broken off or not, the chuck must be cleared for the next shell. In other words, the tapered end of the shell must be ejected from its wedged engagement in the chuck. This requires considerable force, since the action of the hammer has been in the meantime enhancing the wedging engagement.

In U.S. Patent 1,786,029 issued December 23, 1930, to J. H. Phillips there is illustrated the type of key or ejector heretofore used to clear the chuck, that is, remove the tapered end of the shell. In addition to the passageway for accommodating the bail or handle, the chuck has been required to have an additional passageway or hole communicating with the socket for the shell end. The socket is intersected by the latter passageway so that the tapered end of a shell in the socket protrudes into the passageway. A rod is provided having an angularly bent end insertible into the passageway, the rod being generally of the same diameter as the passageway, but having a flat or cam face so that when engaged in the passageway, rotation of the bend end about the axis of the passageway will cause the flat or cam face to engage the back end of the taper of the shell and force the same out of its socket.

As indicated above the principal object of the invention is to provide a chuck with a combined handle and key or ejector and thereby alleviate many difficulties attendant upon the constructions heretofore used.

Other objects of the invention are as follows: the elimination of a passageway through the chuck; the decrease in the length and weight of the chuck; the elimination of the need for the workman removing his hand from the bail, reaching for another tool, inserting the tool into its passageway and operating the same, removing the tool, and picking up the handle once more; the elimination of any likelihood of misplacing or losing or breaking or bending the key or ejector tool; the provision of an easily formed and quickly installed or replaced combined handle and key or ejector tool.

Many advantages are collateral to the above, as will become apparent to those skilled in the art as the invention is described hereinafter, such as for example the enabling of the workman to drive the shell home after inserting the tapered plug and merely rotate the handle in an arc of 90° or so about its axis to release the tapered end of the shell from its socket in the chuck. In order to comply with the patent statutes, a specific and preferred embodiment of the invention has been detailed hereinafter, both in the specification and in the drawing accompanying the same, but only by way of illustration and not limitation, since it will be obvious that considerable variation in the details, size, proportion, and arrangement of the parts is possible without in any way departing from the spirit and scope of the invention, all as defined in the claims appended.

Figure 1:
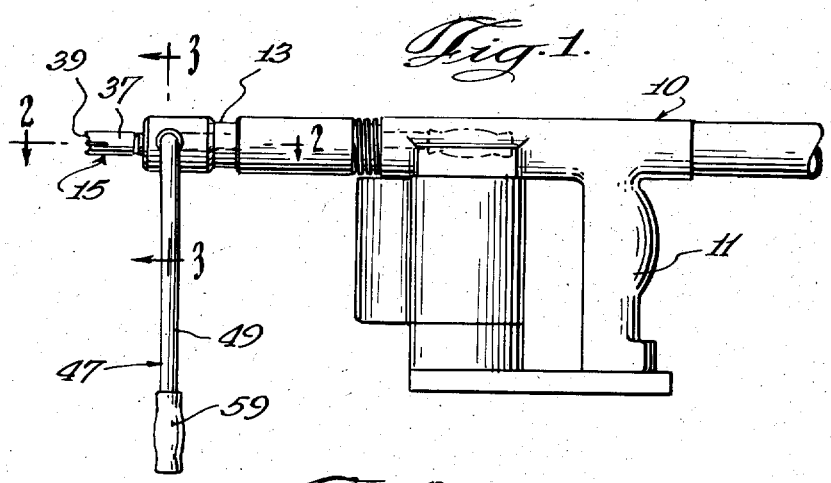
Fig. 1 is a side elevational view of a percussive drill, comprising an electric hammer having the chuck of the invention engaged in the barrel thereof, there being a self-drilling expansible anchor shell wedged in the chuck.
Figure 2:
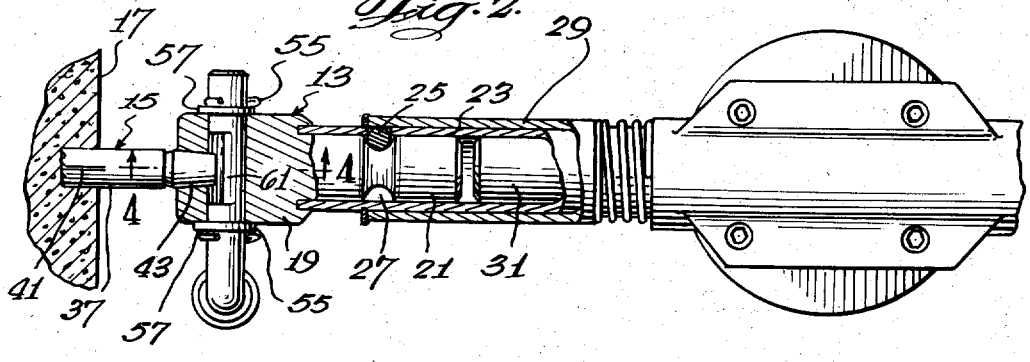
Fig. 2 is a sectional view taken through the drill and chuck of Fig. 1 along the line 2—2 and in the direction indicated, portions being shown in plan, and the view being on an enlarged scale.

The percussive drill is designated 10 and its construction is of no importance to the invention herein, except insofar as it is intended to be grasped by one hand of the workman, at the handle 11 and pushed forward in using the same. The drill 10 mounts a chuck 13 which has a self-drilling expansible anchor shell 15 engaged therein adapted to be driven into a body of masonry or concrete 17.

The chuck 13 comprises an integral head 19 and reduced diameter shank 21 which is inserted in the barrel 23 of the drill 10 and retained therein by the engagement of a key 25 with an annular groove 27 formed in the shank. The key 25 is held in place by means of a spring-pressed cylindrical sleeve 29. Any other means for mounting the shank 21 for receiving the blows of the hammer 31 may be used. The specific structure here shown is the subject matter of a co-pending application, Serial No. 536,670, filed September 21, 1955, which matured into U.S. Patent No. 2,767,988 dated October 23, 1956, and is not intended to be a limitation herein.

The chuck head 19 has a tapered coaxial socket 33 which intersects a transverse passageway 35 arranged normal to the chuck axis. There is illustrated a shell 15 having a cylindrical body 37, usually hollow, a toothed end 39 adapted to be driven into the masonry 17 and expanded along fracture grooves 41, and provided on its opposite end with a taper 43 the length and size of which is such as to matingly wedge in the tapered socket 33. In the shell illustrated there is an annular fracture groove 45 at the base of the taper 43 so that when the shell is driven home the tapered end 43 can be broken off by applying a lateral strain to the same, leaving the stub in the chuck head 19.

The tapered end 43 normally protrudes into the passageway 35. A handle 47 is secured to the chuck head 19 being formed as an L-shaped member having an elongate portion 49 and an integrally bent right angle shaft portion 51. The right angle shaft portion 51 is engaged in the transverse passageway 35, being freely rotatable therein to enable swinging of the handle, and held in place by cotter or other pins 55 preventing axial movement of the right angle shaft portion 51 in the passageway. Friction washers 57 may be used to prevent wear. Obviously any other movement limiting means, such as deformations, shoulders and the like could be used in place of the pins and washers.

Presuming that the handle is arranged as shown in Fig. 1, if the workman is drilling he may grasp the end 59 of the handle 47 and rock it in an arc describing a plane perpendicular to the axis of the chuck 13. The shell will drill its way into the masonry, and there is no difficulty in withdrawing the same, applying the end plug and driving same home.

Instead of the right angle bent shaft portion 51 being uniform in diameter throughout the extent of the passageway 35, it is provided with a reduced diameter cam 61 which is eccentrically positioned to give rise to a space 63 between the cam 61 and the opposite part of the passageway 35. The length of the cam 61 along the shaft portion 51 is substantially less than the diameter of the head 19 to provide suitable journalling for the shaft portion 51 upon the rotation of the handle 47 but is greater than the diameter of the socket 33 to prevent interference with the shell ends.

Figure 5:
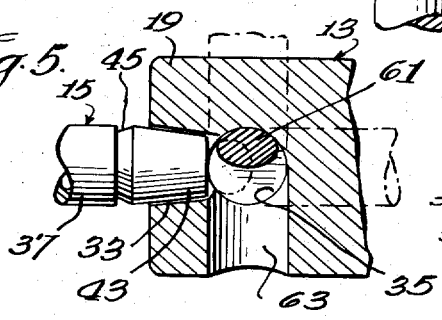
Fig. 5 is a view similar to that of Fig. 4 but showing the arrangement when the handle has been rotated for ejecting the tapered rear end of the shell.

When it is desired to dislodge and eject a tapered end 43, the handle 47 is rotated so that the elongate portion 49 describes a plane parallel to the axis of the chuck 13. The movement of the handle 47 is indicated in broken lines in Fig. 1. In Fig. 5, the position of the cam 61 in solid lines is that assumed when the handle 47 has been rotated for ejection through 90° which in most cases will be sufficient to dislodge the tapered end 43. The broken line position of the cam 61 is that assumed when the handle has been rotated through 180° and it will be obvious that this movement will surely dislodge any stub which protrudes into the passageway 35 even the slightest amount.

Figure 4:
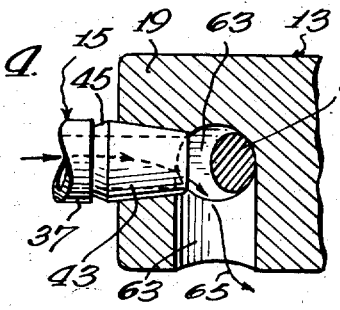
Fig. 4 is a sectional view through the chuck on the line 4—4 of Fig. 2 and in the direction indicated, the handle being arranged in normal position for drilling or driving the shell into the masonry.
Figure 3:
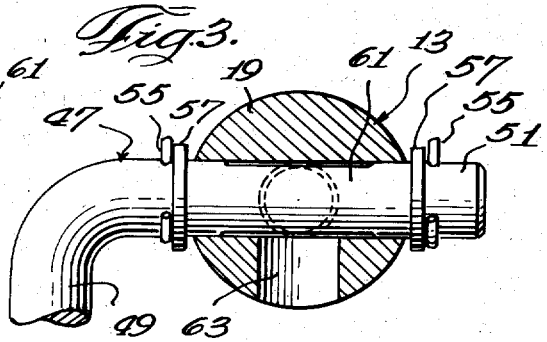
Fig. 3 is a fragmentary sectional view through the chuck along the line 3—3 of Fig. 1 and in the direction indicated.

The workman will obviously not be required to remove his hand from the handle 47 in ejecting a tapered end 43. Note also the provision of a transverse opening 63 communicating with both the socket 33 and the passageway 35 to enable the debris to fall out of the chuck while drilling is taking place. The debris follows the path of the arrowed line 65 in Fig. 4, the space 63 providing convenient clearance without the need for additional openings in the chuck.

Reference is made herein to the chuck axis. This is to be understood as the axis of the socket 33, shank 21, barrel 23, etc.

From the above it will be seen that there has been provided a novel chuck for use with shells having ends engaged in the chuck socket, which is characterized by the provision of a combined handle and key or ejector. No further explanation is believed necessary since the advantages and features of the invention follow from the above specification.

What it is desired to claim is:

1. A chuck for a percussive drill and adapted to mount a self-drilling shell having a tapered end, and also adapted to be rotated while the drill is being used, and comprising a head having a coaxial tapered socket adapted to receive said tapered end wedgingly engaged therein, a transverse passageway having its axis normal to the chuck axis, intersecting the socket so that the tapered end of the shell when installed protrudes into the transverse passageway, and a combined handle and ejector member for rotating the chuck and ejecting the tapered end rotatively engaged in the transverse passageway.

2. A chuck for a percussive drill and adapted to mount a self-drilling shell having a tapered end, and also adapted to be rotated while the drill is being used, and comprising a head having a coaxial tapered socket adapted to receive said tapered end wedgingly engaged therein, a transverse passageway having its axis normal to the chuck axis, intersecting the socket so that the tapered end of the shell when installed protrudes into the transverse passageway, and a combined handle and ejector member for rotating the chuck and ejecting the tapered end rotatively engaged in the transverse passageway, said combined handle and ejector comprising a shaft portion engaged in said passageway, and an angularly connected elongate portion extending from said head, eccentric cam means on said shaft portion aligned with said socket and positioned to give clearance for said tapered end when said elongate portion extends generally at right angle to the chuck axis whereby movement of said elongate portion in a plane normal to said chuck axis will rotate the chuck without disturbing the tapered end of the shell, but swinging of the handle to rotate the shaft portion will bring the cam means into engagement with the said tapered end to eject same.

3. A chuck for a percussive drill and adapted to mount a self-drilling shell having a tapered end, and also adapted to be rotated while the drill is being used, and comprising a head having a coaxial tapered socket adapted to receive said tapered end wedgingly engaged therein, a transverse passageway having its axis normal to the chuck axis, intersecting the socket so that the tapered end of the shell when installed protrudes into the transverse passageway, and a combined handle and ejector member for rotating the chuck and ejecting the tapered end rotatively engaged in the transverse passageway, said combined handle and ejector comprising an L-shaped member the short part being rotative in the transverse passageway and having offset ejecting means, and the long part extending from the chuck to serve as a handle for rotating the chuck during drilling, the ejecting means being inoperative when the long part is at right angle to the chuck axis but being rendered operative when the long part is rotated in a plane parallel to the chuck axis.

4. A chuck as described in claim 3 in which means are provided to limit movement of said short portion axially of the transverse passageway.

5. A chuck as described in claim 3 in which the ejector means comprises a decreased diameter eccentric in the short portion aligned with the socket, having a length along the transverse passageway greater than the diameter of the intersecting part of the socket but less than the diameter of the length of the passageway, and means for maintaining the aligned relationship of socket and eccentric.

6. A chuck as described in claim 3 in which there is a space between said ejecting means and socket when the handle is being used for drilling, and there is a second passageway between intersection of the socket and transverse passageway and the exterior of said chuck to enable discharge of debris through said shell into said space and out of the chuck head.

*7. A chuck for a percussive drill and adapted to mount a self-drilling shell having a tapered end, and also adapted to be rotated while the drill is being used, and comprising a head having a coaxial tapered socket adapted to receive said tapered end wedgingly engaged therein, a transverse passageway having its axis normal to the chuck axis, intersecting the socket so that the tapered end of the shell when installed protrudes into the transverse passageway, and a combined handle and ejector member for rotating the chuck and ejecting the tapered end movably engaged in the transverse passageway.*

*8. A chuck as described in claim 7 in which there is a space between the member and socket when the handle is being used for drilling, and there is a second passageway between the intersection of the socket and*

*transverse passageway and the exterior of the chuck enabling discharge of debris through said shell into said space and out of the chuck head.*

*9. A chuck for a percussive drill and adapted to mount a drilling tool having a tapered end, and also adapted to be rotated while the drill is being operated, and comprising, a head having a coaxial socket tapered for telescopic wedging engagement with said tool end, a transverse passageway having its axis normal to the chuck axis and intersecting the socket so that the tapered end protrudes into the passageway, and a combined handle and ejector member installed in the passageway for rotating the chuck and having means aligned with the protruding tool end movable to exert a force against said end for dislodging the tool end from the passageway without displacing the member from the passageway.*

References Cited in the file of this patent or the original patent

UNITED STATES PATENTS

| | | |
|---|---|---|
| 1,050,385 | Palmgren | Jan. 14, 1913 |
| 1,786,029 | Phillips | Dec. 23, 1930 |
| 1,968,055 | Phillips | July 31, 1934 |